(12) United States Patent
Yang

(10) Patent No.: US 7,177,348 B2
(45) Date of Patent: Feb. 13, 2007

(54) MULTIPATH RECEIVER OF A SPREAD SPECTRUM COMMUNICATION SYSTEM WITH DYNAMIC MATCHED FILTER AND EFFICIENT SIGNAL COMBINER

(76) Inventor: George L. Yang, 15 Longfellow Ct., Freehold, NJ (US) 07728

( * ) Notice: Subject to any disclaimer, the term of this patent is extended or adjusted under 35 U.S.C. 154(b) by 838 days.

(21) Appl. No.: 10/234,293

(22) Filed: Sep. 4, 2002

(65) Prior Publication Data

US 2004/0042538 A1  Mar. 4, 2004

(51) Int. Cl.
*H04B 1/69* (2006.01)
(52) U.S. Cl. .................................. 375/152; 375/143
(58) Field of Classification Search .............. 375/143, 375/152, 343, 346, 130, 140, 147, 150, 316, 375/349; 455/65, 132, 137, 138, 139, 506
See application file for complete search history.

(56) References Cited

U.S. PATENT DOCUMENTS 4,682,149 A * 7/1987 Larson .................. 341/117
5,623,377 A * 4/1997 Behrens et al. ............ 360/65
5,648,983 A * 7/1997 Kostic et al. ............. 375/150
6,445,714 B1 * 9/2002 d'Anjou et al. ........... 370/441

* cited by examiner

*Primary Examiner*—Dac Ha
*Assistant Examiner*—Jaison Joseph

(57) ABSTRACT

A receiver for detecting, tracking and combining multipath components spanned over several symbol periods employs signal register arrays, a reference signal generator, matched filters, a signal combiner, and a decision circuit. The signal register arrays cascade for capturing different sections of a received signal with each section corresponding to a symbol period. The reference signal generator produces blocks of a local reference signal with each block as the local reference signal of a corresponding matched filter, holds these blocks for a symbol period, and then generates next blocks with each block being the successive block of its previous block. Each matched filter finds the correlations between corresponding section of received signal and corresponding section of local reference signal. The signal combiner delays the outputs of different matched filters by different amount of time and then combines the delayed outputs together for the decision circuit to make decisions.

20 Claims, 8 Drawing Sheets

MULTIPATH RECEIVER OF A SPREAD SPECTRUM COMMUNICATION SYSTEM WITH DYNAMIC MATCHED FILTER AND EFFICIENT SIGNAL COMBINER

FEDERALLY SPONSORED RESEARCH

Not Applicable

SEQUENCE LISTING OR PROGRAM

Not Applicable

FIELD OF THE INVENTION

The invention is generally related to the receiver of a communication system. More particularly the invention is related to applying dynamic matched filters for detecting and tracking the components of a multipath signal spanned over several symbol periods in a radio link of a direct sequence spreading spectrum communication system and combining these components efficiently.

BACKGROUND OF THE INVENTION

In a wireless communication system, especially in a mobile communication system, fading occurs from times to times. Buildings, mountains, and foliage on the transmission path between a transmitter and a receiver can cause reflection, diffraction, and scattering on a propagating electromagnetic wave. The electromagnetic waves reflected from various large objects, travel along different paths of varying lengths. If there is an obstacle with sharp irregularities on the transmission path, the secondary waves resulting from the obstructing surface are present around the obstacle. Also if there are small objects, rough surfaces, and other irregularities on the transmission path, scattered waves are created. All these waves will interact with each other and result in multipath fading.

Under some environments such as in many metropolitan areas, there is no line-of-sight signal. The received signal is a multipath-fading signal from reflection, scattering, and diffraction. Statistically no any particular component of the multipath-fading signal is stable for a relatively long period of time and significant stronger than the rest components in a fairly large region. In order to provide service to these areas with good quality, all these major components of the multipath-fading signal have to be combined in some way so that on average the combined signal will be more stable and stronger than each component.

Before any attempting to combine the components of a multipath-fading signal, one has to identify all the significant components. This would require that all the significant components must be recognizable. That is, a transmitted symbol must be different from any of its neighbor symbols within the multipath-spanned range so that a delayed version of a transmitted symbol will be not mistaken as a different symbol.

A direct sequence spread spectrum system can naturally provide a way to distinguish the neighbor transmitted symbols and therefore all the significant components of a multipath-fading signal are recognizable. This is due to the fact that the delayed versions of the transmitted pseudonoise (PN) signal have poor correlation with the original PN signal.

As IP originated messages are more and more popular, packet-switched communication system is more and more common. In a packet-switched communication system, a received package could come from total different source than the one before and the one after, and therefore generally there is no any relation between two adjacent packets. When transmission rate is very high, in order to reduce the capacity loss of communication system and obtain multipath information before the information loses its meaning, one could prefer to use matched-filter instead of correlator.

However, the regular matched filters do not work well. For a regular matched filter, the reference signal is fixed. In a direct sequence spreading spectrum communication system, the reference signal is changing all the time. Some modifications around the matched filter have to be made so that the matched filters are able to detect the various components of a multipath fading signal spanned over several symbol periods even though the reference signal is changing all the time.

The common method to combine several components of a multipath-fading signal consists of several steps. First, let the received signal pass a delay line with taps. The length of delay line should be long enough that the section of received signal captured by the delay line is equal or larger than range spanned by the multipath fading signal. Second, depending on the relative positions of the significant components, the several corresponding taps are selected. Third, the signal from each of selected taps is weighted by a different weight and is aligned properly by phase. And finally all the weighted signals are added together.

The common method of combinations has some drawbacks in a direct communication system.

First, when a multipath-fading signal spans for a large range and when the data rate is high, the above approach could consume a lot of hardware. In a direct sequence communication system, there are 64 chips in each symbol period and a multipath signal spans about 4 symbol periods. If one takes 4 samples in each chip, the delay line will consist of 4×64×4=1024 memory elements. Further suppose there are at most two significant components, in order to be able to select the two corresponding taps, two selective devices are needed with each one is connected to the 1024 memory elements. The selective devices consume a lot of hardware.

Second, a separate circuit could be needed to monitor each significant component. In order to keep good communication quality, one has to constantly monitor the information related to all the significant paths and adjust the weight, phase, and position associated with each significant component. But in a direct sequence spreading spectrum communication system, the signal from a selective tap does not directly provide the necessary information about that corresponding path. A despreading circuit has to be used to despread the signal of a selective tap and then the information about a corresponding path could be extracted.

In order to avoid huge selective devices and a plurality of despreading circuits, one perhaps prefers to despread each significant component by common despreading circuit first then combine these components together.

Based on previous discussions, it would be desirable to provide a mechanism for a receiver of a spreading spectrum communication system to despread all significant multipath components by a bank of matched filters, extract the related information from these despreaded components, and combine all the despreaded significant components efficiently.

OBJECTIVES OF THE INVENTION

The first idea behind the invention is based on the observation that all the significant components of a multipath-fading signal span over a limited range. A bank of matched filters is able to capture all these significant components if each of them can capture the components over a different portion of the limited range.

The second idea behind the invention is based on the observation that for the purpose of signal combination, it is enough to delay some samples of a despreaded signal instead of the despreaded signal itself for some amount of time.

The primary objective of the invention is to provide a method for a receiver of a direct sequence spreading spectrum communication system to detect and track the various components of a multipath fading signal spanned over several symbol periods with a bank of matched filters.

Another objective of the invention is to provide method of delaying the sampled values of a despreaded signal efficiently.

BRIEF DESCRIPTION OF THE DRAWINGS

The accompanying drawings, which are incorporated in and constitute a part of the specification, depict the preferred embodiments of the present invention, and together with the description, serve to explain the principle of the invention. In the figures, like reference numerals refer to the same or similar elements.

DETAILED DESCRIPTION OF THE PREFERRED EMBODIMENTS

Detailed description of the preferred embodiments is provided herein. The embodiments illustrate dynamic matched filter bank, signal combiner, and their applications in a receiver of a communication system by way of examples, not by way of limitations. It is to be understood that it could be easy for those skilled in the art to modify the embodiments in many different ways. Therefore, specific details disclosed are not to be interpreted as limitations, but rather as bases for the claims and as representative bases for teaching one to employ the present invention in virtually any appropriately detailed system, structure or manner.

We assume that there are at most M significant multi-path components and the multipath signal spans over less than L symbols. We further assume that all the significant components of a multipath signal emerging during the communication section will not appear $t_0$ second earlier than the first significant component detected at the beginning of a communication section.

Also we assume that there are N chips in each symbol period, there are K samples in each chip. For simplicity, in the example, we let M=2, L=3, N=10, and K=4.

Let's denote the frequency of sampling clock by $f_s$, the frequency of the X times of the frequency of the sampling clock by $f_X$, the frequency of chip clock by $f_c$, and the frequency of the symbol clock by $f_{sym}$. Correspondingly, the period of sampling clock is denoted by $T_s$ seconds, the period of a clock X times of the frequency of the sampling clock by $T_X$ seconds, the period of a chip by $T_c$ seconds, and period of a symbol by $T_{sym}$ seconds.

Figure 1:
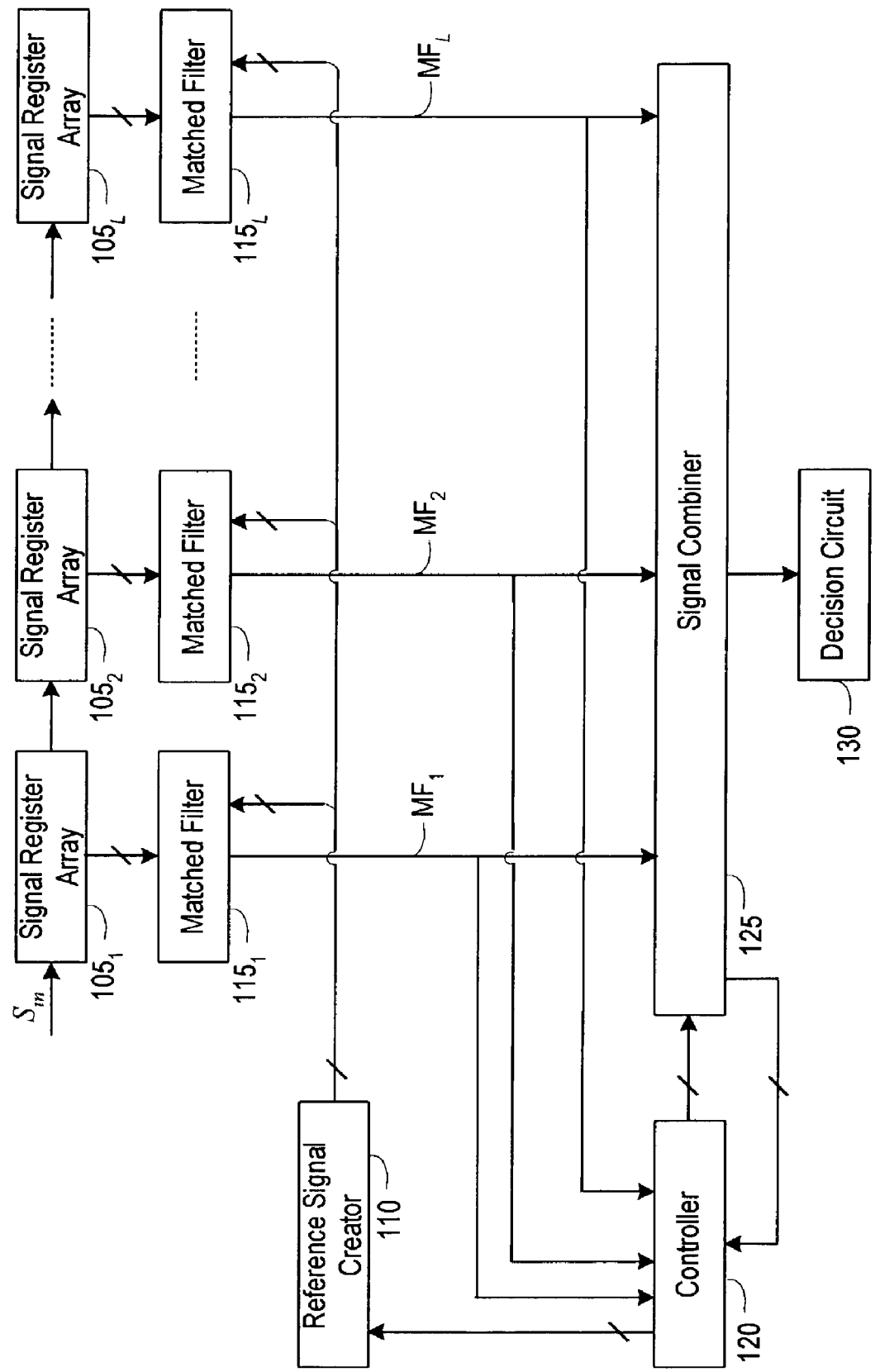
FIG. 1 illustrates the first embodiment of applying a bank of dynamic matched filters and a signal combiner in a receiver of a communication system.

FIG. 1 shows the first embodiment of applying a bank of dynamic matched filters and a signal combiner in a receiver of a communication system.

For simplicity, these matched filters are called dynamic matched filters for their reference signals are different from the time to time.

The received signal $S_{in}$ is fed into signal register array $105_1$, which consists of a plurality of signal shift registers with the first signal shift register coupled to the received signal $S_{in}$ and each of the rest signal shift registers cascaded to its previous signal shift register. There is a tapped output signal from each signal shift register. The received signal $S_{in}$ and all these tapped output signals are sent to matched-filter $115_1$. The tapped output signal from the last signal shift register of the signal registers array $105_1$ is also fed to the first signal shift register of signal register array $105_2$. The signal register array $105_2$ has same number of signal shift registers as the signal register array $105_1$, with each signal shift register cascaded to its previous signal register. Also there is a tapped output signal from each signal shift register. All these tapped output signals are sent to the matched filter $115_2$.

There are totally L signal register arrays from $105_1$ to $105_L$, with one signal register array cascaded by its previous one. All these signal register arrays have exactly the same structures and have same number of tapped output signals. Corresponding to a segment of the received signal $S_{in}$ in one symbol period, the tapped output signals from each signal register array, are sent to a corresponding matched filter from $115_1$ to $115_L$. The output signals from a signal register array form a moving section of received signal $S_{in}$ in sampled version. Each section size is corresponding to a symbol period. The tapped output signals from all these L signal register arrays from $105_1$ to $105_L$, form a big moving section of received signal $S_{in}$ in sampled version. The big moving section has a size corresponding to L times the symbol period.

A shifting clock drive all the signal shift registers of each signal register array. In most case, the shifting clock is the sampling clock.

For simplicity, we further assume that at the beginning of a communication section, there is an identification sequence of L symbols or LN chips for initial estimation of the parameters related to a multipath fading signal. We also assume all these L symbols have same phase. When there are more than L symbols needed for such estimation, either more hardware or some trade-off may be required. When there are less than L symbols needed for such estimation, only portion of the hardware will be used and the unused portion could be disabled.

When a communication starts, the reference signal creator 110 generates L symbols of the identification sequence with each symbol for a corresponding matched filter. The reference signal creator 110 will hold these symbols until $LT_{sym-}t_0$ seconds after a first component of a multipath signal has been detected. Therefore the output of each matched filter is the correlation between a section of the identification sequence and a corresponding section of received signal $S_{in}$. When the summation of the output signals from these matched filters has big signal strength, there is good probability that a component of a multipath signal exists. During initialization, all the components spanned over less than L symbol periods of the multipath signal will be caught up.

$LT_{sym}-t_0$ seconds after the first component of a multipath signal has been detected, the reference signal creator 110 will generate L local reference symbols with each one for a corresponding matched filter every symbol period. The reference symbol of any of the L matched filters changes from one symbol period to another.

Corresponding to L signal register arrays, there are L matched filters from $115_1$ to $115_L$. Each of these matched filters $115_i$, i=1, . . . L, is to find the correlation between its reference signal and its input signal from a corresponding signal register array. The output of matched filters $115_i$ is denoted by $MF_1$, with i=1, . . . L.

The controller 120 extracts information from various devices such as matched filters and signal combiner, and provides various control signals to block reference signal generators and signal combiner.

The information collected from the outputs of all these matched filters are used for not only updating the information about the currently tracked significant components such as the signal strengths, phases, and positions, but also looking for new significant components. A significant component of the multipath-fading signal emerged after initialization, will be detected by the controller 120 from the output signal of each matched filter. When the output from a particular matched filter is significant at a same position for continuous several symbol periods, there is a good probability that a new significant component has emerged.

When the significant components of the multipath signal is shifted to one side or another side, the controller 120 will properly adjust the instant to update the reference signal creator 110 so that no significant component will not be detected.

The signal combiner 125 combines the various significant component of a multipath signal together. Taking the output signal of signal combiner 125 as its input signal, the decision circuit 130, makes a decision on the transmitted symbol.

Figure 2:
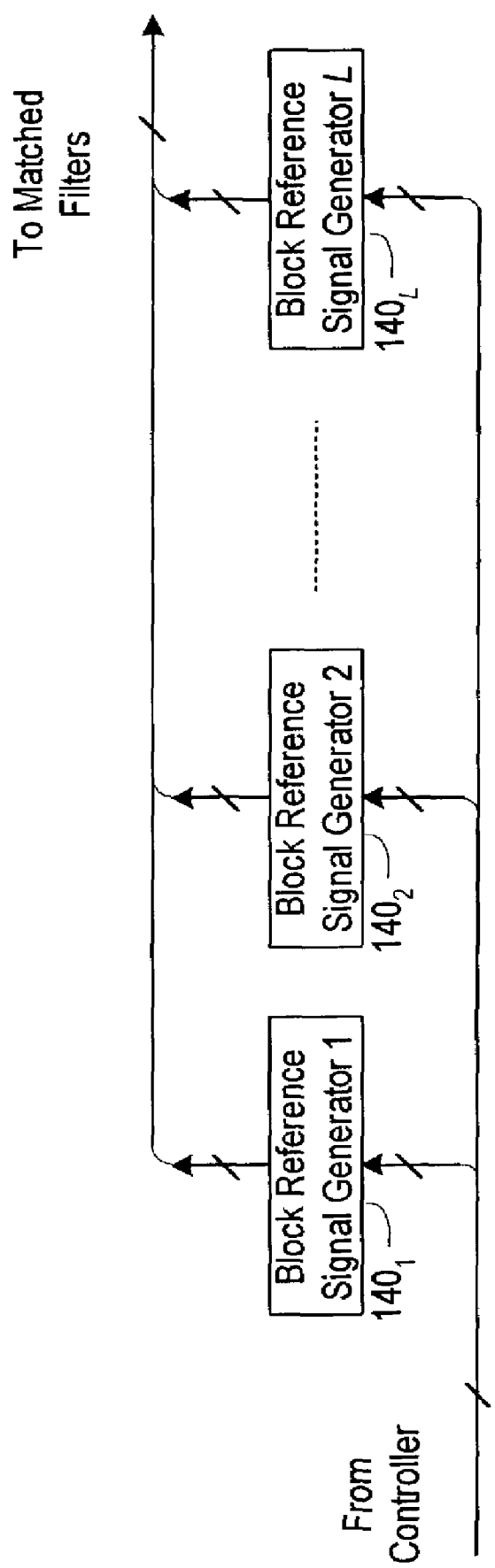
FIG. 2 illustrates the first implementation of the reference signal creator in a FIG. 1.

FIG. 2 shows the first implementation of the reference signal creator 110 in a FIG. 1.

There are L block reference signal generators $140_1$ to $140_L$, with each one under control of different control signals from the controller 120.

When a communication starts, under the control of the controller 120, the L block reference signal generators $140_1$ to $140_L$ generate the L symbols of the identification sequence and hold these symbols until $LT_{sym-}t_0$ seconds after the first component of a multipath signal has been detected. Then, a normal communication starts. Under the control of the controller 120, the L block reference signal generators $140_1$ to $140_L$ generate L identical reference symbols every symbol period. The controller 120 has control on these reference signal generators on when to update their output symbols.

Figure 3:
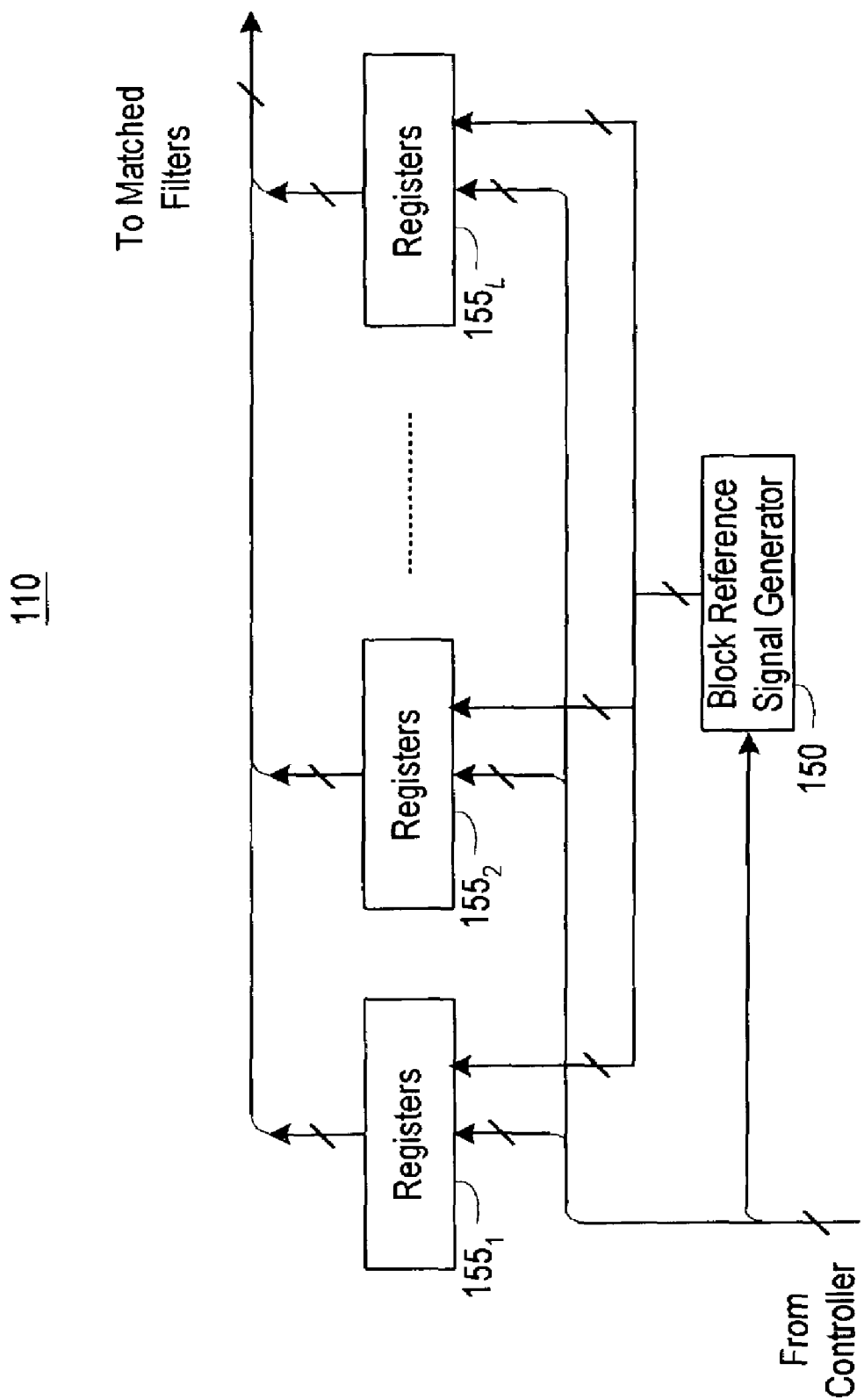
FIG. 3 illustrates the second implementation of the reference signal creator in a FIG. 1.

FIG. 3 shows the second implementation of the reference signal creator 110 in a FIG. 1.

There is a block reference signal generator 150 and L registers $155_1$ to $155_L$.

When a communication starts, under the control of the controller 120, the block reference signal generator 150 generates L symbols of the identification sequence and each of the L registers $155_1$ to $155_L$ will catch one of the L symbols. The L registers $155_1$ to $155_L$ will hold these symbols until $LT_{sym-}t_0$ seconds after the first component of a multipath signal has been detected. Then, the block reference signal generator 150 will generate a new symbol at the interval of every symbol period and each of the L registers $155_1$ to $155_L$ will catch the same new symbol simultaneously. The controller 120 has control on the block reference signal generator 150 on when to generate a new symbol and the L registers $155_1$ to $155_L$ on when to catch their input symbols.

Instead of using L registers $155_1$ to $155_L$, one skilled in the art can also use L combination logic circuits with each combination logic circuit transferring the current state or current section of the block reference signal generator 150 into a different state or a different section separating from the current state or current section by a predefined number of chips. The block reference signal generator 150 generates a state, holds the state for one symbol period, and then produces a new state separating from the old state by number of chips in a symbol period. Usually a section could be a state but depending on requirement, a section could have more or less chips than a state. For example, in a linear feedback shift register with 15 stages, a state can be expressed with 15 bits. If in a particular application, a symbol has 30 chips instead of 15 chips, then a section will correspond to 30 chips. One skilled in the art can also use just a block reference signal generator and L-1 register arrays. Here each register array has N registers and N tapped outputs. Each register of the first register array takes a corresponding tapped output of the block reference signal generator as its input and update every symbol period. Each register of a sequential register array takes a corresponding tapped output of its previous register array as its input and updates every symbol period.

Figure 4:
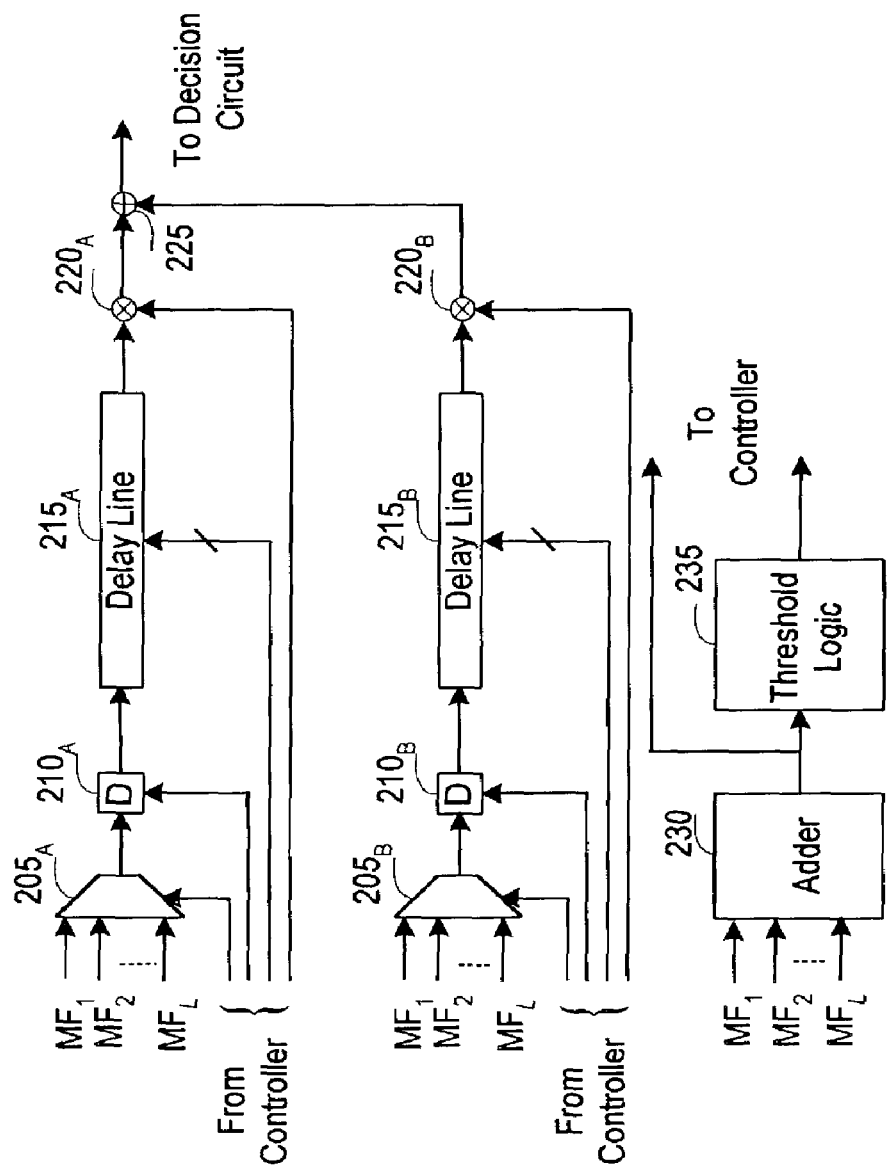
FIG. 4 illustrates the signal combiner in a FIG. 1.

FIG. 4 shows the signal combiner 125 in a FIG. 1.

From the assumption that there are at most M possible significant components of a multipath signal, there are M identical mechanisms each for capturing each one of the M components. For simplicity, only the first one will be explained.

The mechanism for capturing the first component, consists of a demultiplexer $205_A$, a sampling device $210_A$, a delay line $215_A$, and a complex multiplier $220_A$.

The demultiplexer $205_A$ takes the output signals of all matched filters $115_1$ to $115_L$, denoted by $MF_1$ to $MF_L$ as its input signals. A control signal from the controller 120 makes the demultiplexer $205_A$ pass a desired matched filter output signal to a sampling device $210_A$.

Another control signal from the controller 120 makes the sampling device $210_A$ take samples from the output of demultiplexer $205_A$ at proper instants. The sampling device $210_A$ could consist of D flip-flops and be driven by a sampling clock $f_s$.

The output of sampling device $210_A$ is fed to a delay line $215_A$. Under the control signals from the controller 120, a proper delay is inserted. The output of the delay line $215_A$ is multiplied at the multiplier $220_A$ by a complex weight signal from the controller 120. The complex weight signal has a magnitude proportional to the average signal strength of the first component and a phase compensating for first component.

The output signals from all M multiplier $220_A$ to $220_B$ are added at adder 225. The summation will be sent to the decision circuit 130 in FIG. 1.

The output signals of all matched filters are also fed to adder 230. During the initialization, the threshold logic circuit 235 checks if the output signal of adder 230 has a signal strength stronger than a threshold and flags if a component of a multipath signal has been detected. Both the output signals of adder 230 and threshold logic circuits 235 are sent to controller 120 for extracting the information related to the component at the beginning of a communication section.

Figure 5:
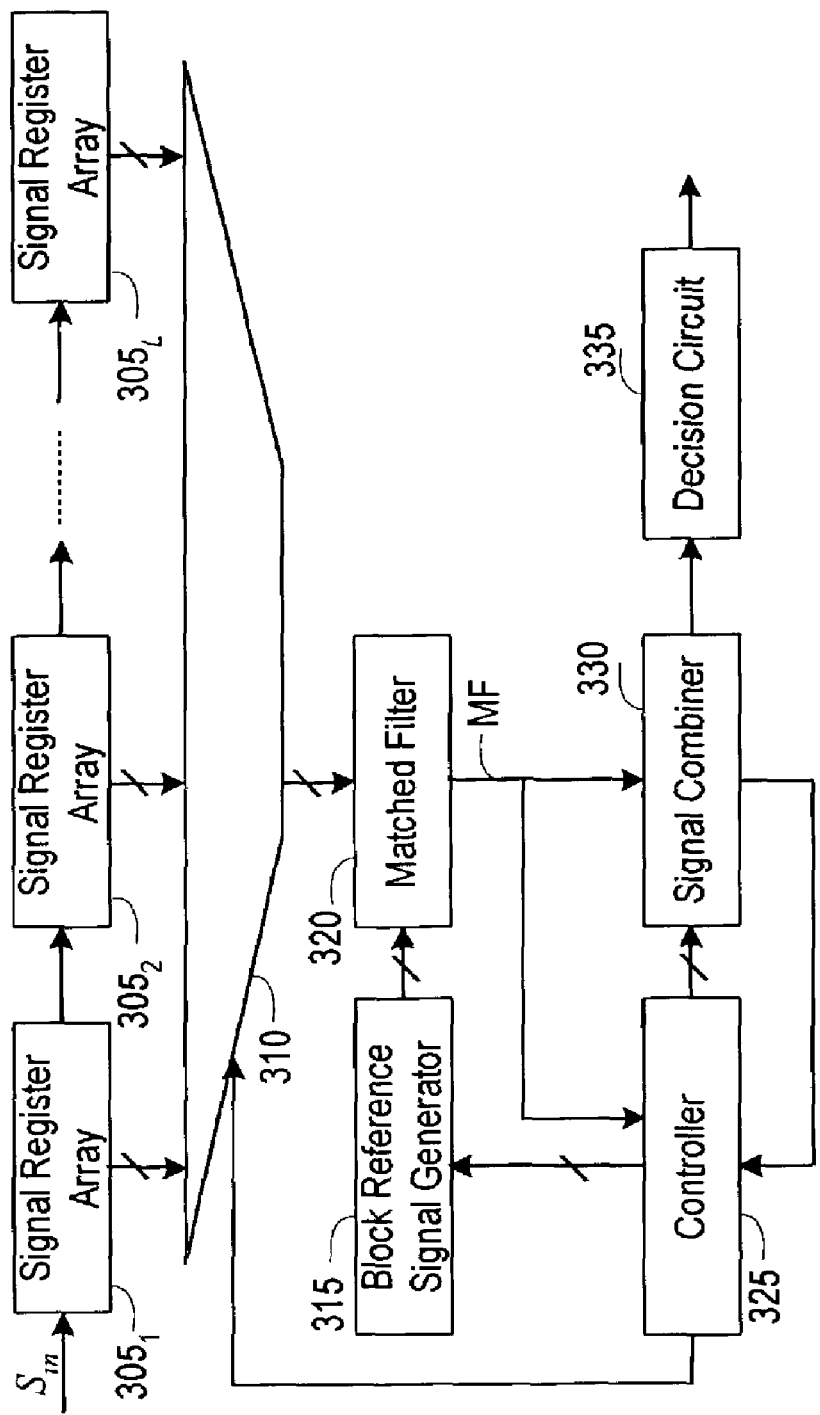
FIG. 5 illustrates the second embodiment of applying a dynamic matched filter and a signal combiner in a receiver of a communication system.

FIG. 5 shows the second embodiment of applying a dynamic matched filter and a signal combiner in a receiver of a communication system.

The received signal $S_{in}$ and the signal register array $305_1$ to $305_L$ in FIG. 5 are same as the received signal $S_{in}$ and the signal register array $105_1$ to $105_L$ in FIG. 1 respectively.

The output signals from each of the L signal register arrays $305_1$ to $305_L$ are connected to the multiplexer 310. A control signal from controller 325 makes the multiplexer 310 select output signals from each of signal register arrays by turn. The multiplexer 310 has to work at a frequency at least L time of the shifting clock of these signal registers. The output of multiplexer 310 is connected to the matched filter 320.

There is a block reference signal generator 315. At the initial stage of a communication section, the block reference signal generator 315 will generate L reference symbols of the identification sequence with each reference symbol corresponding to a signal register array. After $LT_{sym\_}$ $t_0$ seconds of the moment when the first component of a multipath signal is detected, the block reference signal generator 315 will generate one symbol or N chips every symbol period. The output of the block reference signal generator 315 is connected to the matched filter 320.

The matched filter 320 is used to find the correlation value between the current section of the reference signal and a corresponding section of the received signal represented by the output signals of a signal register array. It works at least L times as fast as the shifting clock of the L signal register arrays $305_1$ to $305_L$.

The output signal of matched filter 320, denoted by MF, is sent to both controller 325 and signal combiner 330.

The signal combiner 330 is used to combine the up to M significant multipath signals together. The output from signal combiner 330 is sent to decision circuit 335 to make a final decision on which symbol is transmitted.

Figure 6:
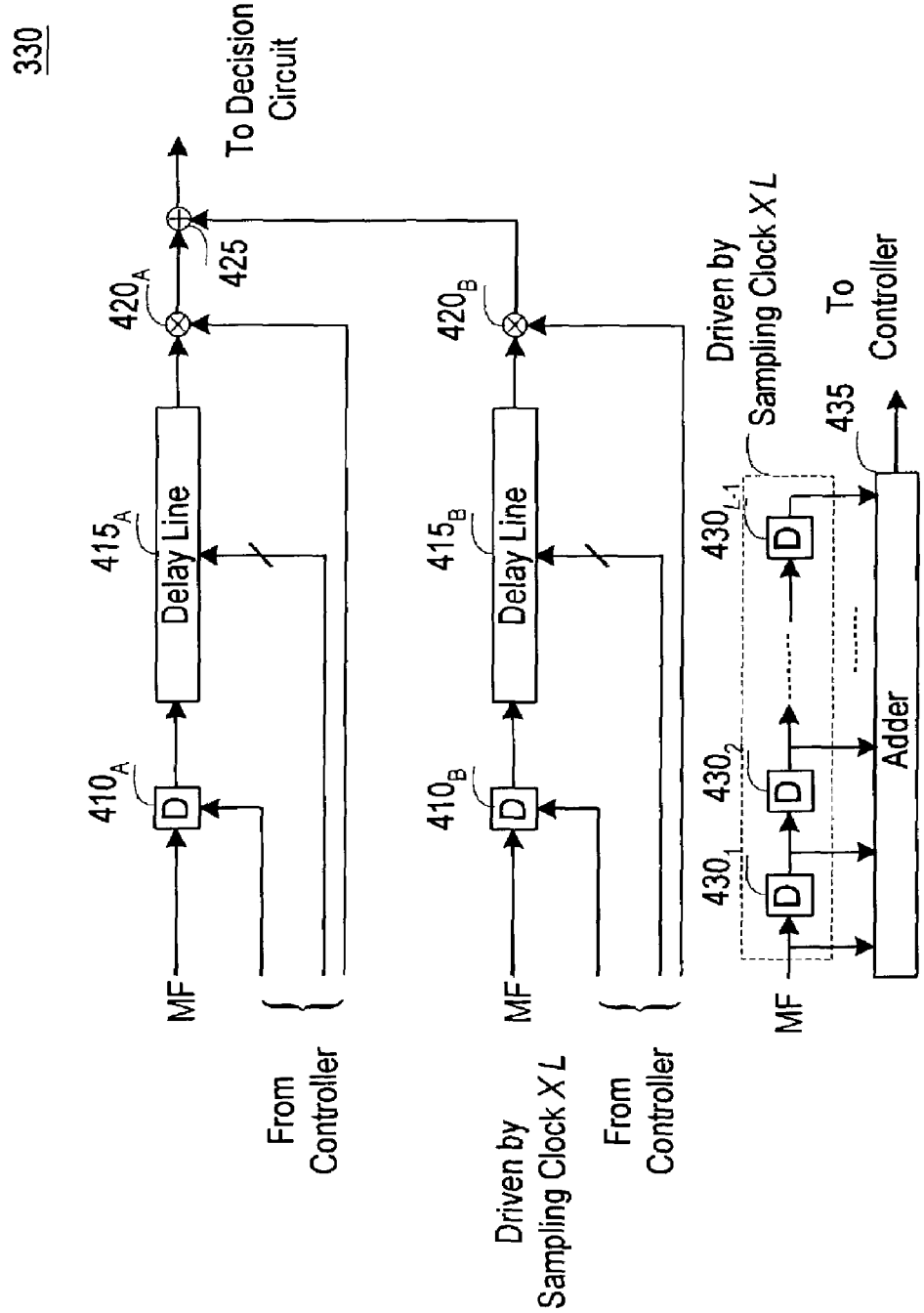
FIG. 6 illustrates the signal combiner in a FIG. 6.

FIG. 6 shows the signal combiner 330 in a FIG. 5.

As in FIG. 4, among the M exactly same mechanisms for capturing M possible paths, only the first one will be explained.

The output of matched filter 320 is fed to a sampling device $410_A$. The sampling device $410_A$ could consists of D flip-flops and be driven by a clock with a frequency at least L times of the shifting clock $f_s$. A control signal from the controller 325 makes the sampling device $410_A$ to take samples from the output of matched filter 320 at proper instants.

The output of sampling device $410_A$ is fed to a delay line $415_A$. Under the control signals from the controller 325, a proper delay is inserted. The output of the delay line $415_A$ is multiplied at multiplier $420_A$ by a complex weight signal from the controller 325. The complex weight signal has a magnitude proportional to the average signal strength of the first component and a phase compensating for first component.

The output signals from all M multiplier $420_A$ to $420_B$ are added at adder 425. The summation will be sent to the decision circuit 335 in FIG. 5.

The output signal from the matched filter 320 is also fed to L−1 memory devices $430_1$ to $430_{L−1}$. These devices work at a frequency of L times the shifting frequency of signal registers in the signal register array $305_1$ to $305_L$. The L−1 output signals from L−1 memory devices $430_1$ to $430_L\_1$ and the output signal MF from matched filter are sent to an adder 435. The output signal of the adder 435 will be sent to the controller 325, which will check the signal at proper instants and find out if there is a significant component.

Figure 7:
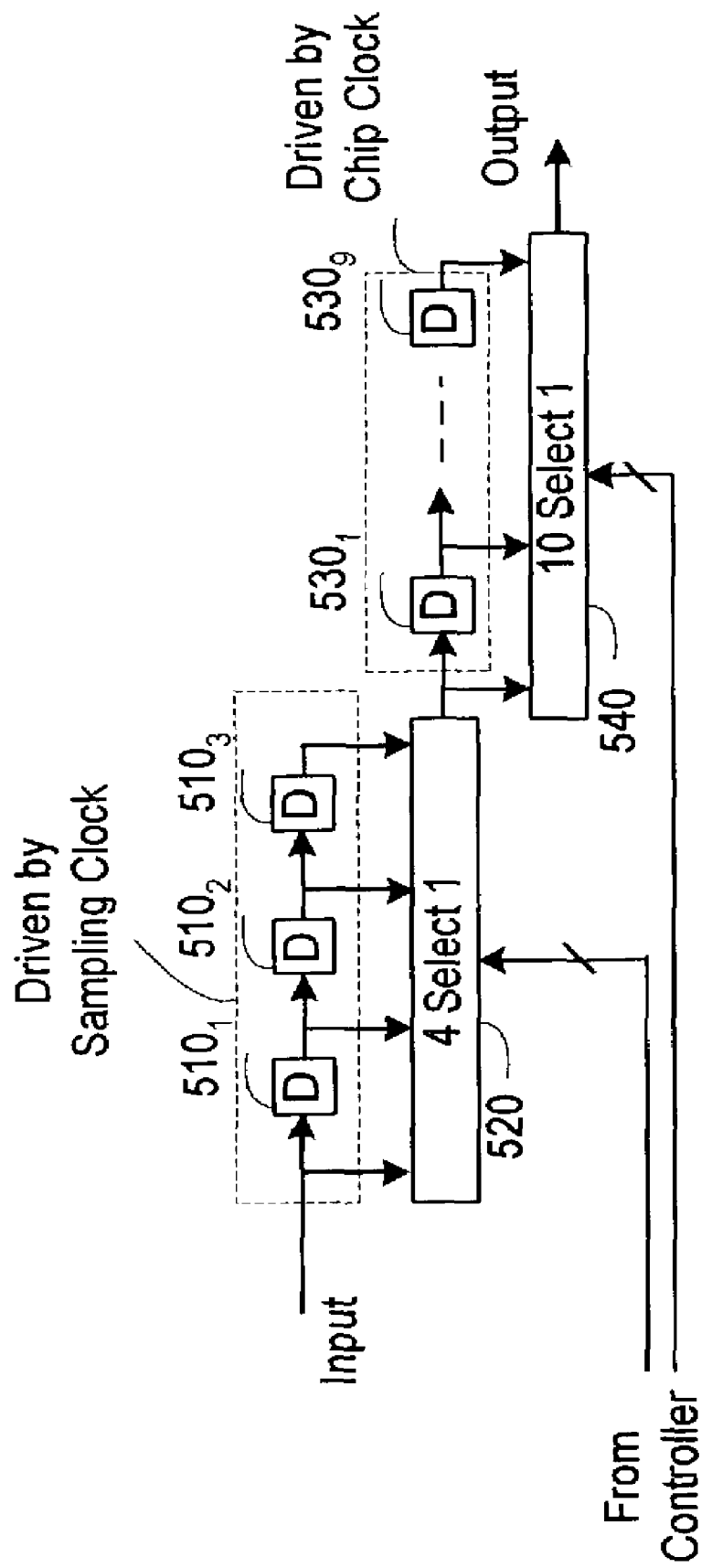
FIG. 7 illustrates the first implementation of the delay line used in FIG. 4 and FIG. 6.

FIG. 7 shows the first implementation of the delay line 215 in FIG. 4 and the delay line 415 in FIG. 6.

There are K−1=3 memory elements $510_1$ to $510_3$. The input signal is fed to the first memory elements $510_1$ and each of the rest memory elements is cascaded to its previous one. Sampling clock $f_s$ drives these memory elements $510_1$ to $510_3$. They could be a plurality of D flip-flops. Both the input signal and the outputs of memory devices $510_1$ to $510_3$ are sent to a selecting device 520.

Under a control signal from a controller, the selecting device 520 selects one input signal from its K=4 input signals as its output signal.

There are another N−1=9 memory elements $530_1$ to $530_9$. The output signal of the selecting device 520 is fed to the first memory elements $530_1$ and each of the rest memory elements is cascaded to its previous one. These memory elements are driven by a chip clock $f_c$. They could be a plurality of D flip-flops. Both the input signal to the first memory element $530_1$ and the output signals of memory devices $530_1$ to $530_9$ are sent to a selecting device 540.

Under a control signal from a controller, the selecting device 540 selects one input signal from its N=10 input signals as its output signal.

Though FIG. 7 shows an example of a delay line for a delay equal to the summation of numerous chip intervals and numerous sample intervals, one skilled in the art can easily extend the structure shown on FIG. 7 by various ways. Since each memory element is used to generate a delay in FIG. 7, one can call a memory element as a delay element or a delay device. For easier description, a selecting device and the memory elements connected to the same selecting device is called a delay array. In a direct sequence spread spectrum communication system, there can be three delay arrays cascaded with each delay array consisting of numerous delay elements and a selecting device. A first delay array generates a delay of multiple of a sampling interval with the total delay less than a chip interval. Each delay element in the first delay array works at a sampling clock. A second delay array generates a delay of multiple of a chip interval with the total delay less than a symbol interval. Each delay element in the second delay array works at a chip clock. A third delay array generates a delay of multiple of a symbol interval. Each delay element in the third delay array works at a symbol clock. To save power, one skilled in the art can further add a circuit for letting each delay element in the first delay array and in the second delay array to take a sample once in a symbol period from its input signal at a moment determined according to a desired delay. Instead of using many delay elements in the first delay array and the second delay array, one skilled in the art can also employ just one delay element in the first delay array and in the second delay array respectively with each delay element taking a sample once in a symbol period from its input signal at a moment determined according to a desired delay and holding its sample for a certain amount of time. The certain amount of time is an interval not longer than a symbol period but long enough to let the sample taken by each delay element to be used by another device. Usually, a designer can take a symbol period as the certain amount of time.

Figure 8:
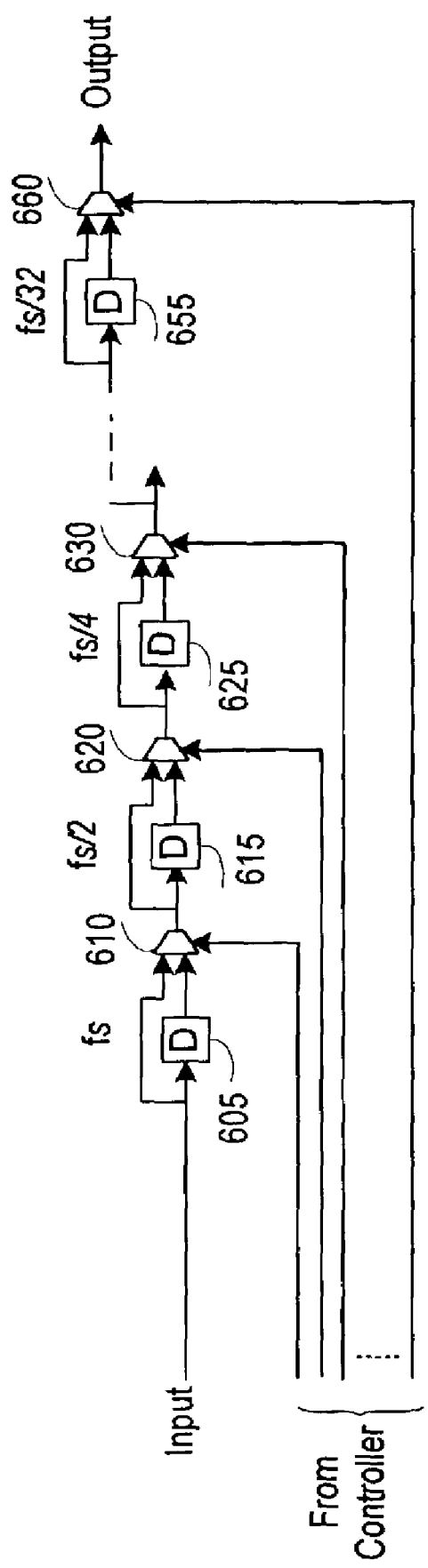
FIG. 8 illustrates the second implementation of the delay line used in FIG. 4 and FIG. 6.

FIG. 8 shows the second implementation of the delay line 215 in FIG. 4 and the delay line 415 in FIG. 6.

Various significant components, after matched filter, are all in one symbol period. Therefore, the maximum delay is no more than a symbol period or N·K samples. The relative position of any multipath component can be represented by no more than $\lceil \log_2(N \cdot K) \rceil$ binary bit. When N=10 and K=4, we obtain $\lceil \log_2(N \cdot K) \rceil = \lceil \log_2(40) \rceil = 6$, where $\lceil x \rceil$ denotes the smallest integer larger or equal to x. Any delay d in the right range could be unique expressed by $$d = n_0 \cdot T_s + n_1 \cdot (2T_s) + n_2 \cdot (4T_s) + n_3 \cdot (8T_s) + \ldots + n_k \cdot (2^k T_S)$$

Where $k = \lceil \log_2 (N \cdot K) \rceil - 1 = 5$ and $n_i = 1$ or 0 for $i = 0, \ldots, k$.

The delay line in FIG. 8 consists of $\lceil \log_2(N \cdot K) \rceil$ memory elements 605 to 655 and $\lceil \log_2(N \cdot K) \rceil$ multiplexers 610 to 660. The memory elements could consist of D flip-flops. Each of these $\lceil \log_2(N \cdot K) \rceil$ memory elements 605 to 655 is driven by a different clock and therefore produces a different delay.

The control signals from a controller will make each of the multiplexers to select a proper input signal as its output and therefore a desired delay will be generated.

Input signal is fed to the memory element 605 and the multiplexer 610. The memory element is driven by the sampling clock $f_s$. Depending on the value of $n_0$, a different control signal will be generated. When $n_0=1$, a control signal will let multiplexer 610 pass the output signal of the memory element 605; otherwise, the control signal will let multiplexer 610 pass the input signal of the memory element 605.

The output signal of multiplexer 610 is fed to the memory element 615 and multiplexer 620. The memory element 615 is driven by a clock whose frequency is half of the sampling clock $f_s$. Depending on the value of $n_1$, a different control signal will be generated. When $n_1=1$, a control signal will let multiplexer 620 pass the output signal of the memory element 615; otherwise, the control signal will let multiplexer 620 pass the input signal of the memory element 615.

Similarly, the output signal of multiplexer 620 is fed to the memory element 625 and multiplexer 630. The memory element 625 is driven by a clock whose frequency is one-fourth of the sampling clock $f_s$. Depending on the value of $n_2$, a different control signal will be generated. When $n_2=1$, a control signal will let multiplexer 630 pass the output signal of the memory element 625; otherwise, the control signal will let multiplexer 630 pass the input signal of the memory element 625.

In this way, the output signal of multiplexer 650 (not shown in the figure) is fed to the memory element 655 and multiplexer 660. The memory element 655 is driven by a clock whose frequency is $\frac{1}{32}$ of the sampling clock $f_s$. Depending on the value of $n_5$, a different control signal will be generated. When $n_5=1$, a control signal will let multiplexer 660 pass the output signal of the memory element 655; otherwise, the control signal will let multiplexer 660 pass the input signal of the memory element 655.

FIG. 8 demonstrates a delay line according to the representation of possible delay to the base 2. A person can easily build a delay line according to the representation of possible delay to any integer base b with $b \geq 2$. For example, suppose the delay range is 0 to $26T_s$. Then, the delay d can be expressed as $(n_2 \cdot 3^2 + n_1 \cdot 3^1 + n_0 \cdot 3^0)T_s$ with each $n_i$ taking one of the values 0, 1, and 2. For each delay section corresponding to a term in d's representation, there are two cascaded delay elements working at same frequency with three output signals fed to a corresponding multiplexer. The three output signals are the input signal to the first delay element and two output signals from the two cascaded delay elements. A person can also combine some terms of a representation of possible delay to integer base b together. For instance, one can combine the first term and third term together to generate a new expression $(n_1 \cdot 3^1 + n'_0 \cdot 3^0)T_s$ with $n_1$ taking one of the values 0,1 and 2 and with $n_0$ taking one of the values 0, 1, 2, 9, 10, 11, 18, 19, 20. In order to avoid losing resolution, the frequency of the shifting clock used by the memory elements for a delay section closer to the front of a delay line should be not lower then the frequency of the shifting clock used by the memory elements for a delay section far away from the front of the delay line. Furthermore, a person skilled in art can derive a configuration of delay line based on the combination of the representations of two or more different bases.

What is claimed is:

1. A system for detecting, tracking and combining a multipath fading signal, wherein said multipath fading signal has a plurality of significant multipath components spanned over a plurality of symbol periods, said system comprising:

a plurality of cascaded signal register arrays with very first signal register array coupled to receive said multipath fading signal and with each of rest signal register arrays coupled to receive a signal from its previous signal register array for holding a plurality of sections of said multipath fading signal with each section corresponding to a symbol period, wherein each signal register array consists of a plurality of shift registers with a tapped output from each shift register;

a reference signal generator for producing a plurality of sections of a local reference signal with each section having number of chips corresponding to a symbol period, holding for a predefined amount of time, and updating at predefined moments;

a plurality of matched filters, with each matched filter coupled to receive a section of said plurality of sections of said multipath fading signal from a corresponding signal register and to receive a section of said plurality of sections of said local reference signal from said reference signal generator, for producing a plurality of correlation signals with each correlation signal indicating a correlation value between a section of said plurality of sections of said multipath fading signal captured by a signal register array and a section of said plurality of sections of said local reference signal;

a signal combiner, coupled to receive said plurality of correlation signals from said plurality of matched filters, for delaying said plurality of correlation signals by a plurality of different amount of time to produce a plurality of delayed signals and combining said plurality of delayed signals to produce a combined signal;

a decision circuit, coupled to receive said combined signal from said signal combiner, for making a decision on a symbol transmitted by a transmitter; and a controller circuit, coupled to receive said plurality of correlation signals from said plurality of matched filters and to receive said combined signal from said signal combiner, for detecting said plurality of significant multipath components, generating and updating a multipath profile, and producing a plurality of timing signals to control said signal combiner and said reference signal generator, wherein said multipath profile determines said plurality of different amount of time, whereby during normal data transmission, said reference signal generator generates said plurality of sections of said local reference signal with each section being different for capturing and updating said plurality of significant multipath components spanned over a plurality of symbol periods.

2. The system for detecting, tracking and combining a multipath fading signal in claim 1, wherein said reference signal generator comprises a plurality of block reference signal generators with each block reference signal generator producing a section of said plurality of sections of said local reference signal corresponding to a symbol period, holding said section for said predefined amount of time, and then generating a next section of said plurality of sections of said local reference signal.

3. The system for detecting, tracking and combining a multipath fading signal in claim 1, wherein said reference signal generator comprises a block reference signal generator and a plurality of register arrays with said block reference signal generator producing a different section of said plurality of sections of said local reference signal for each register array and with each register array providing a section of said plurality of sections of said local reference signal to a corresponding matched filter, holding said section for said predefined amount of time, and updating at said predefined moments.

4. The system for detecting, tracking and combining a multipath fading signal in claim 1, wherein said reference signal generator comprises a block reference signal generator and a plurality of circuits with said block reference signal generator producing a section of said plurality of sections of said local reference signal, holding said section for said predefined amount of time and then producing next section of said plurality of sections of said local reference signal and with each circuit coupled to receive said section of said plurality of sections of said local reference signal and coupled to provide a modified section to a corresponding matched filter, transferring said section into said modified section with said modified section separated from said section by a predefined amount of shifts.

5. The system for detecting, tracking and combining a multipath fading signal in claim 2, wherein each block reference signal generator comprises a plurality of shift registers with a circuit to shift a plurality of chips at a time, said plurality of shift registers producing an output signal reflecting a current state of said plurality of shift registers.

6. The system for detecting, tracking and combining a multipath fading signal in claim 1, said system having an initial synchronization sequence consisting of a plurality of different symbols, wherein said reference signal generator produces said plurality of sections of said local reference signal with each section corresponding to a different symbol during initial setup period.

7. A system for detecting, tracking and combining a multipath fading signal, wherein said multipath fading signal has a plurality of significant multipath components spanned over a plurality of symbol periods, said system comprising:
a plurality of cascaded signal register arrays, with first signal register array coupled to receive said multipath fading signal and with each of rest signal register arrays coupled to receive a first signal from its previous signal register array, for holding a plurality of sections of said multipath fading signal with each section corresponding to a symbol period, wherein each signal register array consists of a plurality of shift registers with a tapped output from each shift register;
a multiplexer, coupled to receive a plurality of signals from said plurality of cascaded signal register arrays, for selecting one of said plurality of signals as its output signal at a time and for selecting each of said plurality of signals by turn;
a block reference signal generator for generating a plurality of sections of a local reference signal with each section generated at a different moment and having number of chips corresponding to a symbol period;
a matched filter, coupled to receive said output signal from said multiplexer and said plurality of sections of said local reference signal from said block reference signal generator, for providing a second signal indicating a plurality of correlation values between said plurality of sections of said multipath fading signal and said plurality of sections of said local reference signal;
a signal combiner for delaying said second signal corresponding to a different signal array by a different amount of time to generate a plurality of delayed signals, and combining said plurality of delayed signals to produce a combined signal;
a decision circuit, coupled to receive said combined signal from said signal combiner, for making a decision on a symbol transmitted by a transmitter; and
a controller coupled to receive said second signal from said matched filter and said combined signal from said signal combiner, for detecting said plurality of multipath components, generating and updating a multipath profile, and producing a plurality of timing signals.

8. The system for detecting, tracking and combining a multipath fading signal in claim 7, wherein said block reference signal generator comprises a chip generator and a plurality of register arrays, said chip generator having a plurality of shift registers with a plurality of tapped outputs and a circuit to shift a plurality of chips at one time and to hold for a predefined number of chips, said plurality of register arrays each having a plurality of registers with a tapped output from each register and with a register array taking said plurality of tapped outputs as its inputs and each sequential register array taking tapped outputs from its previous register array.

9. The system for detecting, tracking and combining a multipath fading signal in claim 7, wherein said signal combiner scales each of said plurality of delayed signals with a corresponding weight determined by said multipath profile to produce a plurality of weighted delayed signals and then combining said plurality of weighted delayed signals to produce a combined signal for said decision circuit to make a decision.

10. A delay line for delaying a sampled version of an input signal at a resolution of predefined interval for an amount of time, comprising:
a plurality of cascaded delay arrays for producing a plurality of delay amount with a different cascaded delay array working at a different frequency, each cascaded delay array comprising a plurality of cascaded delay elements and a multiplexer for producing a different amount of delay, wherein said multiplexer receives a signal fed to said each cascaded delay array and a plurality of tapped out signals with each from a corresponding cascaded delay element as a plurality of input signals; and
a control device for generating a plurality of control signal according to said amount of time with each control signal for controlling a multiplexer in a corresponding cascaded delay array to select one of said plurality of input signals as its output signal;

whereby a delay array of said plurality of cascaded delay array coupled to receive said input signal works at a first clock rate with a precision corresponding to said predefined interval, each consecutive delay array coupled to receive an output signal from its previous cascaded delay array works at a second clock rate lower than said first clock rate, and said control device generates said plurality of control signals for selecting al proper transmission path for said sampled version of said input signal according to said amount of time, and said delay line generates a delayed version of said sampled version of said input signal with a delay time equal to said amount of time.

11. The delay line for delaying a sampled version of an input signal at a resolution of a predefined interval for an amount of time in claim 10, said delay line having three cascaded delay arrays with a first cascaded delay array working at sampling clock, with a second cascaded delay array working at chip clock, and with a third cascaded delay array working at symbol clock.

12. The delay line for delaying a sampled version of an input signal at a resolution of a predefined interval for an amount of time in claim 11, said delay line further comprising a circuit, wherein said circuit generates a control signal for making very first delay element of said first cascaded delay array take samples once in every symbol period from said input signal at particular moments determined by said amount of time.

13. The delay line for delaying a sampled version of an input signal at a resolution of a predefined interval for an amount of time in claim 11, said delay line further comprising a circuit, wherein said first cascaded delay array and said second cascaded delay array each comprises a delay element and a multiplexer, said circuit generating a plurality of control signals for making each delay element in said first cascaded delay array and in said second cascaded delay array taking samples once in a symbol period from its input signal at particular moments determined by said amount of time, preventing each cascaded delay element from taking samples on any other moments, and making each delay element to hold samples long enough for a delay element in a successive cascaded delay array to take samples.

14. The delay line for delaying a sampled version of an input signal at a resolution of a predefined interval for an amount of time in claim 10, said delay line delaying periodical samples taken on said input signal once a symbol period for said amount of time and having an integer m predetermined for maximum number of terms in a representation of maximum delay range to an integer base b with a term corresponding to said integer base b to power 0 as a first term and with another term corresponding to said integer base b to integer power r as a second term, said first term taking said predefined interval as its unit, said second term taking said symbol period as its unit, wherein said control device generates said plurality of control signals according to a plurality of coefficients in a representation of said amount of time to an integer base b, said delay line having r delay arrays with each delay array having (b−1) cascaded delay elements and working at 1/b of a frequency at which its previous delay array works and having a delay array having $b^{(m-r)}-1$ delay elements by combining said second term and all other higher terms and working at a clock rate corresponding to said symbol period.

15. The delay line for delaying an input signal for a certain amount of time in claim 10, wherein said control device generates said plurality of control signals according to a representation of maximum delay range to an integer base b with a plurality of predetermined terms combined, said delay line having number of delay arrays equal to number of terms left and number of cascaded delay elements in each delay array equal one less than maximum possible value for a coefficient of a corresponding term.

16. A system for delaying a periodically sampled version of an input signal for an amount of time at a resolution specified by a first interval with a period defined by a second interval, said system having an integer m predetermined for maximum number of terms in a representation of maximum delay range to an integer base b with a term corresponding to said integer base b to power 0 as a first term and with another term corresponding to said integer base b to integer power r as a second term, wherein said first term takes said first interval as its unit, wherein said second term takes said second interval as its unit, said system comprising:

a plurality of cascaded delay arrays having r cascaded delay arrays of first type and having a cascaded delay array of second type, wherein each said r cascaded delay arrays of said first type comprises (b−1) cascaded delay elements with very front delay element coupled to receive a feeding signal and a first-type multiplexer having b inputs coupled to receive outputs of said (b−1) cascaded delay elements and to receive said feeding signal, wherein said cascaded delay array of second type comprises $b^{(m-r)}-1$ delay elements by combining said second term and all other terms with higher power together with very front delay element coupled to receive another feeding signal and a second-type multiplexer having J inputs coupled to receive outputs of said $b^{(m-r)}-1$ cascaded delay elements and to receive said another feeding signal, and wherein J is less than or equal to $b^{(m-r)}$; and a plurality of control signals, obtained according to m coefficients of said m terms in a representation of said amount of time to said integer base b, for controlling each first-type multiplexer to select one of its b inputs as its output and for controlling said second-type multiplexer to select one of J inputs as its output, whereby a delay array corresponding to said first term takes said input signal as its feeding signal and each successive delay array takes an output signal from its previous delay array as its feeding signal;

whereby a plurality of cascaded delay elements in a delay array work at a frequency different from another frequency at which a plurality of cascaded delay elements in another delay array work; and whereby said system having r delay arrays with a delay array working at a frequency corresponding to said first interval and with sequential delay array working at a frequency of 1/b of its previous delay array and having a delay array working at a clock corresponding to said second interval.

17. The system for delaying a periodically sampled version of an input signal for an amount of time at a resolution specified by a first interval with a period defined by a second interval in claim 16, said system further comprising means for generating said plurality of control signals according to said representation of maximum delay range to said integer base b with a plurality of predetermined terms selected combined to produce a combined term, said combined term being expressed by a unit corresponding to less significant term of said plurality of predetermined terms, said system having number of delay arrays equal to number of terms left and number of cascaded delay elements in each delay array equal to one less than a maximum coefficient of a corresponding term.

18. The system for delaying a periodically sampled version of an input signal for an amount of time at a resolution specified by a first interval with a period defined by a second interval in claim 16, wherein said integer base b is equal to 2.

19. The system for delaying a periodically sampled version of an input signal for an amount of time at a resolution specified by a first interval with a period defined by a second interval in claim 18, if each possible delay can be expressed by no more than r terms in a representation to integer base 2, said system further comprising r clock generators with a clock rate different from another clock rate by an integer power of 2 with each delay array having one delay element and with each multiplexer having two inputs.

20. The system for delaying a periodically sampled version of an input signal for an amount of time at a resolution specified by a first interval with a period defined by a second interval in claim 16, said system further comprising a circuit, wherein said circuit generates a control signal for making very first delay element of said first term take samples once in every said second interval from said input signal at particular moments determined by said amount of time.

* * * * *